(12) United States Patent
Daly et al.

(10) Patent No.: US 12,174,984 B2
(45) Date of Patent: Dec. 24, 2024

(54) APPLICATION ACCESS LOGGER (71) Applicant: Apple Inc., Cupertino, CA (US)

(72) Inventors: Marion Patricia Daly, Sunnyvale, CA (US); Ada D. Avery, San Francisco, CA (US); Lina J. Butler, Eureka, CA (US); Brian J. Dawbin, Santa Clara, CA (US); Garrett F. Robinson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 314 days.

(21) Appl. No.: 17/722,294

(22) Filed: Apr. 15, 2022

(65) Prior Publication Data

US 2022/0382894 A1 Dec. 1, 2022

Related U.S. Application Data (60) Provisional application No. 63/195,672, filed on Jun. 1, 2021.

(51) Int. Cl.
*G06F 21/62* (2013.01)
*G06F 21/31* (2013.01)
*G06F 21/60* (2013.01)

(52) U.S. Cl.
CPC .......... *G06F 21/6218* (2013.01); *G06F 21/31* (2013.01); *G06F 21/604* (2013.01)

(58) Field of Classification Search
CPC .... G06F 21/6218; G06F 21/31; G06F 21/604; G06F 2221/2111
See application file for complete search history.

(56) References Cited

U.S. PATENT DOCUMENTS

| | | | | |
|---|---|---|---|---|
| 7,774,790 B1 * | 8/2010 | Jirman | ................ | G06F 11/3476 |
| | | | | 719/318 |
| 9,363,223 B2 | 6/2016 | Arquette et al. | | |
| 11,244,347 B2 | 2/2022 | Ma et al. | | |
| 2017/0091473 A1 * | 3/2017 | Agarwal | ............... | G06F 21/606 |
| 2017/0103221 A1 * | 4/2017 | Goel | ................... | G06F 11/3636 |
| 2017/0329979 A1 * | 11/2017 | Behl | ....................... | G06F 21/74 |
| 2017/0344408 A1 * | 11/2017 | Tan | ......................... | G06F 9/546 |
| 2019/0236312 A1 * | 8/2019 | Peuhkurinen | ....... | G06F 21/6218 |
| 2022/0066845 A1 * | 3/2022 | Lu | .......................... | G06F 21/51 |

* cited by examiner

*Primary Examiner* — Beemnet W Dada
(74) *Attorney, Agent, or Firm* — BAKERHOSTETLER (57) ABSTRACT

The subject technology provides systems and methods for logging data access by applications. A first process executing on an electronic device may receive an access request from a second process executing on the electronic device. The access request may include a request to access data corresponding to a protected data category. Subsequent to receiving the access request, the first process may determine whether the second process is authorized to access the data. In response to determining that the second process is authorized to access the data, the first process may grant the second process access to the data, and then generate and store log data corresponding to the access of the data by the second process.

20 Claims, 5 Drawing Sheets

APPLICATION ACCESS LOGGER

CROSS REFERENCE TO RELATED APPLICATIONS

This application claims the benefit of priority to U.S. Provisional Patent Application No. 63/195,672, entitled "Application Access Logger," filed on Jun. 1, 2021, the disclosure of which is hereby incorporated herein in its entirety.

TECHNICAL FIELD

The present description relates to electronic devices, and, more particularly, for example, to logging data access activity of applications of an electronic device.

BACKGROUND

Electronic devices, such as laptops, tablets, and smartphones include applications with which data can be accessed, generated, modified, and stored. The applications can be used by a user to access data, and applications can sometimes access data as part of background processes that the user may not see or be otherwise aware.

BRIEF DESCRIPTION OF DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the present disclosure and is not intended to represent the only configurations in which the present disclosure can be practiced. The appended drawings are incorporated herein and constitute a part of the detailed description. The detailed description includes specific details for the purpose of providing a thorough understanding of the present disclosure. However, the present disclosure is not limited to the specific details set forth herein and can be practiced using one or more other implementations. In one or more implementations, structures and components are shown in block diagram form in order to avoid obscuring the concepts of the present disclosure.

The subject system generally relates to logging the access of data, such as user data, by applications running on an electronic device. According to one or more implementations of the present disclosure, a system is provided in which a first process executing on an electronic device may receive an access request from a second process executing on the electronic device. The access request may include a request to access data (e.g., user data and/or other data for which access may be restricted with varying levels of access control). Subsequent to the receiving of the request, the first process determines whether the second process is authorized to access the data. In case the second process is authorized to access the data, the first process may grant the second process access to the data, and may generate and store log data corresponding to the access of the data by the second process. The log data may include, for example, a structured log data entry including information, such as (but not limited to) an identifier of the second process, an identifier of the data accessed by the second process, time information (e.g., timestamp(s)) associated with the data access by the second process, and/or other data that describes one or more features of the data access.

The generation and storage of the log data provides a high-resolution and/or discrete insight into data accessed by the applications running on the electronic device. For instance, the log data may be accessible to users on the electronic device, enabling the users to gain knowledge about which applications accessed what data and/or at what time and/or for how long the data was accessed. By gaining such knowledge, the users may take appropriate actions, such as users may modify the access permissions of applications, block access by certain applications, remove certain applications from the electronic device, and the like. The systems and methods of the present disclosure provide a transparent and security driven solution for data access by applications on an electronic device.

Figure 1:
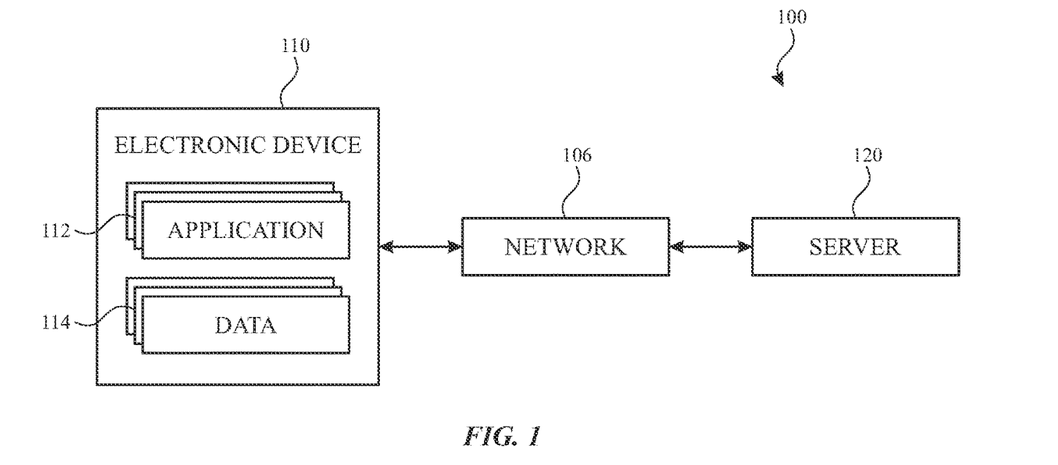
FIG. 1 illustrates an example network environment in accordance with one or more implementations of the present disclosure.

FIG. 1 illustrates an example network environment 100 in accordance with one or more implementations of the present disclosure. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes a network 106, an electronic device 110, and a server 120. The network 106 may communicatively (directly or indirectly) couple the electronic device 110 and the server 120. In one or more implementations, the network 106 may be an interconnected network of devices that may include, or may be communicatively coupled to, the Internet. For explanatory purposes, the network environment 100 is illustrated in FIG. 1 as including the electronic device 110 and the server 120, however, the network environment 100 may include any number of electronic devices and any number of servers.

The electronic device 110 may be, for example, a desktop computer, a portable electronic device such as a laptop computer, a smartphone, a peripheral device (e.g., a digital camera, headphones), a tablet device, a wearable device such as a watch, a band, and the like. The electronic device 110 may be, and/or may include all or part of, the electronic system discussed below with respect to FIG. 6.

In an example, the electronic device 110 may include a plurality of applications 112 and data 114. Examples of the applications may include news applications, social media applications, stock applications, browser applications, camera applications, etc. The data 114 may include user data, such as contacts, audio, video, location, etc. and/or other protected data (e.g., data for which access is restricted) and/or unprotected data (e.g., unrestricted access data such as public data). The data 114 may further include data corresponding to or generated by one or more systems processes of the electronic device 110.

The data 114 may correspond to one or more protected categories, including but not limited to, a photo category, a contact category, a location category, a microphone category, a camera category, and the like. In various examples, the protected categories may include any category of data (not limiting to the categories indicated above) that includes data flagged or otherwise marked as private data, personal data or personally identifiable data associated with a user or another person, data that can be captured by a sensor of the device or another device, data for which access is restricted (e.g., to selected users and/or authorized persons), and/or data for which access to requires a permission (e.g., by means of a password, a permission prompt on a display, biometrics or any other suitable authentication mechanism) by a user. However, these examples are not exhaustive, and the data 114 may include data of other protected data categories. The user's permission may be requested by various applications at the time of installation of such applications and/or at the time when the access to the data is requested. In an example, the user's permissions corresponding to such applications may be stored and maintained in a database (e.g., a permission database) within an internal storage of the electronic device 110 and/or an external storage (e.g., cloud storage) associated with and accessible by the electronic device 110.

In one or more implementations, a first process executing on the electronic device 110 may receive an access request from a second process executing on the electronic device 110. The first process may be a system process, such as an access service. The second process may be an application process, e.g., a process corresponding to an application 112 running on the electronic device 110. In an example, the first process may be a same system process for controlling the access to data associated with protected categories, or it may be different system processes for controlling the access to data associated with different protected data categories, respectively. The access request may include a request to access data corresponding to a protected data category.

The first process may subsequently determine whether the second process is authorized to access the data. For instance, the first process may identify the application corresponding to the second process and may accordingly check and verify the access permission relating to data access for the identified application. In cases in which the first process determines that the application has the permission for data access to the protected data category of the requested data, the first process may determine that the second process is authorized to access the requested data.

Alternatively, if the application does not have the permission, the first process may determine that the second process is not authorized to access the data. In one or more implementations, the first process may deny the access request. In one or more implementations, the first process or the second process may prompt a permission request on a display of the electronic device 110. The permission request may include a request for user approval and/or authentication for accessing data pertaining to the protected category. In response to the permission request, a user of the electronic device 110 may provide an input on the display to either grant or deny the permission.

After it is determined that the second process is authorized to access the data, the first process may grant the second process access to the data and generate log data. The log data corresponds to the access of the data by the second process and may include an identifier of the second process, an identifier of data accessed, a timestamp, and/or any other information describing the access of the data by the second process. The generated log data may be stored in internal storage of the electronic device 110 and/or other storage for which access is controlled by the electronic device 110 and/or another electronic device that is registered to and/or signed into a common account with the electronic device 110.

Figure 2:
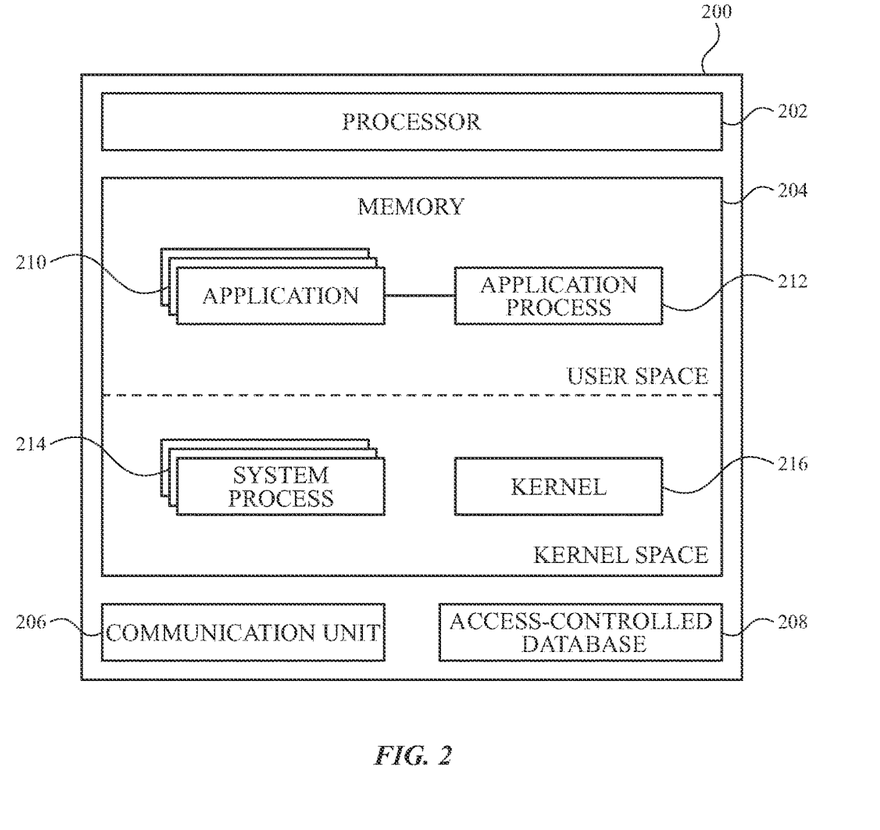
FIG. 2 illustrates an example system, in accordance with one or more implementations of the present disclosure.

FIG. 2 illustrates an example system 200, in accordance with one or more implementations of the present disclosure. In an example, the system 200 may be implemented in computing devices, such as the electronic device 110. In another example, the system 200 may be implemented either in a single device or in a distributed manner in a plurality of device, the implementation of which would be apparent to a person skilled in the art.

In an example, the system 200 may include a processor 202, and memory 204 (memory device), a communication unit 206, and an access-controlled database 208, which may be either an internal storage or an external storage.

In an example, the processor 202 may be a single processing unit or a number of units, all of which may include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The communication unit 206 may include one or more hardware units that support wired or wireless communication between the processor 202 and processors of other electronic devices.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The memory 204 may include a plurality of applications 210, an application process 212 of one or more of the applications 210, a plurality of system processes 214 and an operating system kernel 216. In an example, the application process 212 may operate in a user space or a kernel space. In one or more implementations, the electronic device 110 may further include an access control system that is unified or extensible to interoperate with the system processes 214 or frameworks (e.g., privacy frameworks) on the electronic device 110.

In one or more implementations, a first process of the electronic device 110 may receive a request to access data corresponding to a protected data category from a second process of the electronic device 110. In one or more implementations, the first process may be the system process 214 and the second process may be the application process 212. In one or more implementations, the first process and the second process may both be system processes, such as the system processes 214. In one or more implementations, the first process may be the system process 214 and the second process may be a system process, a first party application process (e.g., a process corresponding to an application provided by the developer of the operating system of the electronic device 110), a third-party process, (e.g., a process corresponding to an application developed by a developer different than the developer of the operating system of the electronic device 110) or any other process provided for execution at the electronic device 110 by any type of application developer. In an example, the first process may be a process executed by an access control system of the electronic device 110. The access control system may be, for example, a single and/or unified access control system for controlling access by various applications, or it may be one of a plurality of different access control systems, one corresponding to each of the protected data categories. Further, the first process may include more than one system processes, for example, one system process that is executed by the access control system for controlling access and then a separate system process (e.g., a logging process) for logging the data access by the applications.

The data (e.g., user data) may correspond to a protected data category. Examples of the protected data category may include, but are not limited to, a photo category, a contact category, a location category, a microphone category, a camera category, general user data category, or any other category of data for which access is restricted. For example, the data corresponding to the photo category may include photos stored on, accessible to, or captured by the electronic device 110, the data corresponding to the contact category may include details of contacts (e.g., names, phone numbers, email addresses, images, etc.) stored on or accessible to the electronic device 110, and the data corresponding to the location category may include data related to locations stored on or detected in real-time by one or more positioning sensors (e.g., GPS) in the electronic device 110. The data corresponding to the microphone category may include data related to usage of the microphone of the electronic device 110 and/or voice recordings or real-time audio detected by the microphone on the electronic device 110. The data corresponding to the camera category may include data related to usage of one or more cameras of the electronic device 110, and/or multimedia (e.g., images or videos) captured by the camera of the electronic device 110. In an example, the data may be stored in the memory 204. In an implementation, the data may also include data stored in a cloud storage associated with an account to which the electronic device 110 is registered and/or signed-in, and accessible to the electronic device 110.

In one or more implementations, the data mentioned above may also include data corresponding to real-time events, such as, for example, an ongoing call, a recording of an ongoing call, a live video, a live location, etc.

In an example, the access control system of the electronic device 110 may be configured to allow definition of what operation(s) constitute an access to data for purposes of triggering the log data generation and storage, for each of the protected data category, such as by the user, by an application corresponding to the protected data category, and/or by a system process. For example, for the photo category a data access may be defined as viewing a photo library. In another example, for the photo category a data access may be defined as actual usage of the photo (e.g., obtaining the photo for sending in a message, sending the photo to another device, editing the photo) as an access, as opposed to just viewing photos in the photo library. In another example, for the photo category, the data access may be defined as capturing a photo (e.g., a screenshot of content displayed by a display of the device) and/or distributing a captured photo (e.g., distributing a screenshot to another application or process at the device or to another device).

In one or more implementations, the request to access data (also referred to herein as an access request) may be associated with an instantaneous event or a durational event. An instantaneous event may be an event that is performed substantially instantaneously (e.g., within a fraction of a second) or in one shot, such as capturing an image, capturing a location, accessing a contact, obtaining an image stored at the device, sending a message, etc. A durational event may be an event that continues for a period of time, having, for example, a start time and an end time, such as capturing a video, tracking a location, recording audio, extended use of a microphone or extended use of a camera at the electronic device.

In one or more implementations, upon receiving the access request from the second process, the first process may determine whether the second process is authorized to access the data. The determination, in an example, may be based on an application identifier included in the access request that corresponds to an application associated with the second process. The application identifier may be, for example, a numerical or alphanumeric identifier of the application and/or an application name.

In an example, the first process may access a permission database including details of a plurality of applications and associated permissions or authorizations provided by the users previously. Subsequently, based on the application identifier, the first process may determine, using the permission database, if the application associated with the second process is permitted to access the data corresponding to the protected category or not. In one or more implementations, to determine that an application is authorized to access the requested data, the access control system may perform entitlement checks. Upon passing the entitlement checks, the application may be determined to be authorized to access the requested data, and the access control system may, for example, provide a sandbox extension to the application or associated application process to access the requested data from the electronic device 110.

In case it is determined that the application is not permitted access the data, the first process may determine that the second process is not authorized to access the data. In such a case, the first process may deny the second process from accessing the requested data.

In one or more implementations, the first process may itself perform the determination. In one or more other implementations, the first process may request an authorization process which may be another system process, such as another of the system processes 214, to perform the authorization. Accordingly, in some implementations, the determination may also include requesting a third process to determine whether the second process is authorized to access data or not, where the third process is a system process. In such implementations, the third process may make the authorization determination using the permission database that contains details of the permissions provided by the users previously. For example, if a user has previously authorized the second process or the application associated with the second process access to the data corresponding to a protected category, the third process may check those prior authorization from the permission database to determine if the second process has the authorization to access the data corresponding to that protected category.

In one or more implementations, on determining that the second process is authorized to access the data, the first process may grant the second process access to the requested data. Furthermore, the first process and/or another system process may generate and store log data corresponding to the access of the data by the second process.

In an example, the log data may be stored in a structured format and may include a structured log entry or a semantically structured log entry that can easily be accessed and/or interpreted by end users. For example, log data may include an identifier of the second process. The identifier may be, for instance, a name and/or application identifier of the application associated with the second process. Further, the log data may include an identifier of the data accessed by the second process. For instance, a name of the category of data, such as photo data, location data, contact data, camera data, etc., and/or other identifier may also be included in the log data. Furthermore, a name of the particular file that was accessed may also be included in the log data. The log data may also include time information corresponding to the access of the data. In the case of an instantaneous access event, the time information may include a timestamp associated with the instantaneous access event (e.g., the time at which the instantaneous access event occurred). In the case of a durational access event, the time information may include a start timestamp associated with a beginning of the durational access event and an end timestamp associated with an end of the durational access event. However, these examples of the log data that may be generated and/or stored in connection with a data access event are not exhaustive, and other log data may be generated and stored. In some examples, the log data may include an indicator of whether an application was in the foreground of the display of the device running the application when a data access event occurred. In one or more implementations, the identifier of the second process, the identifier of the data accessed by the second process, the time information, the indicator of whether the application (e.g., corresponding to the second process) was in the foreground at the time of the data access, and/or other indicators associated with a data access may be generated and/or stored for any protected data category (e.g., all protected data categories). In one or more implementations, other log data may be generated and stored only for some protected data categories or for a specific protected data category. In one example, if an application or other process at a device records the content of the display of the device (e.g., in a screenshot or a video recording of the screen content), log data for the recording may include identifiers of both an accessor process that captures the recording and a broadcaster process that distributes the screen recording event (e.g., which may be identifiers that are not generated and/or stored for other types of access of other protected data categories).

The first process may store the log data in the access-controlled database 208, which may be directly accessible to one or more system processes, such as one or more of the system processes 214, at the electronic device 110 based on one or more access rights. The access right may be a read-only right, a write-only access right, or any suitable access right. Because the log data may itself include sensitive data (e.g., data that could indicate the activity of the user of the device), storing the log data in the access-controlled database 208 maintains the protected status of data that may be derived from or otherwise related to data in various protected categories.

In one or more implementations, the first process may cause displaying of the log data on a display of the electronic device 110 (e.g., responsive to a request from the user of the electronic device 110, which may include authorization information from the user). In one or more implementations, the display of log data may be arranged in a time series format. For example, prior to the displaying, the first process may align the log data in a time series with at least one additional stored log data for time-aligned display or may trigger another process, such as a separate logging process to align the log data in a time series with at least one additional stored log data for time-aligned display.

In one or more implementations, the first process or any other system process 214 may automatically delete the log data after a predefined retention period. As an example, the first process or any other system process 214 may automatically delete the log data which is older than five days, ten days, thirty days, or another predefined retention period. In an example, the retention time period is configurable and may be configured based on a user input.

In one or more implementations, (e.g., implementations in which the second process is a first-party process, a third-party process, or a process developed by another type of application developer) the second process may make a call for the access request to an access control system corresponding to the first process. After authorization and after the permission to access the requested data is granted to the second process, the access control system may trigger a logging process to generate the log data and store the log data in a repository, such as the access-controlled database 208. In one or more implementations, the first process may include the access control system and the logging process. In one or more other implementations, the access control system and the logging process may be separate processes.

In one or more implementations, the first process or another system process 214 may receive a query for stored log data for the second process and/or other processes that have accessed data at the electronic device 110. The first process or another system process 214 may generate and provide a query result for the query. In an example, the query may be received from a system process 214 seeking to display the log data on the display of the electronic device 110. In another example, the query may be received from an external system and/or external device or a process that performs an action based on the query results. In an example, the query results identify information for each protected data category accessed by the second process.

Figure 3:
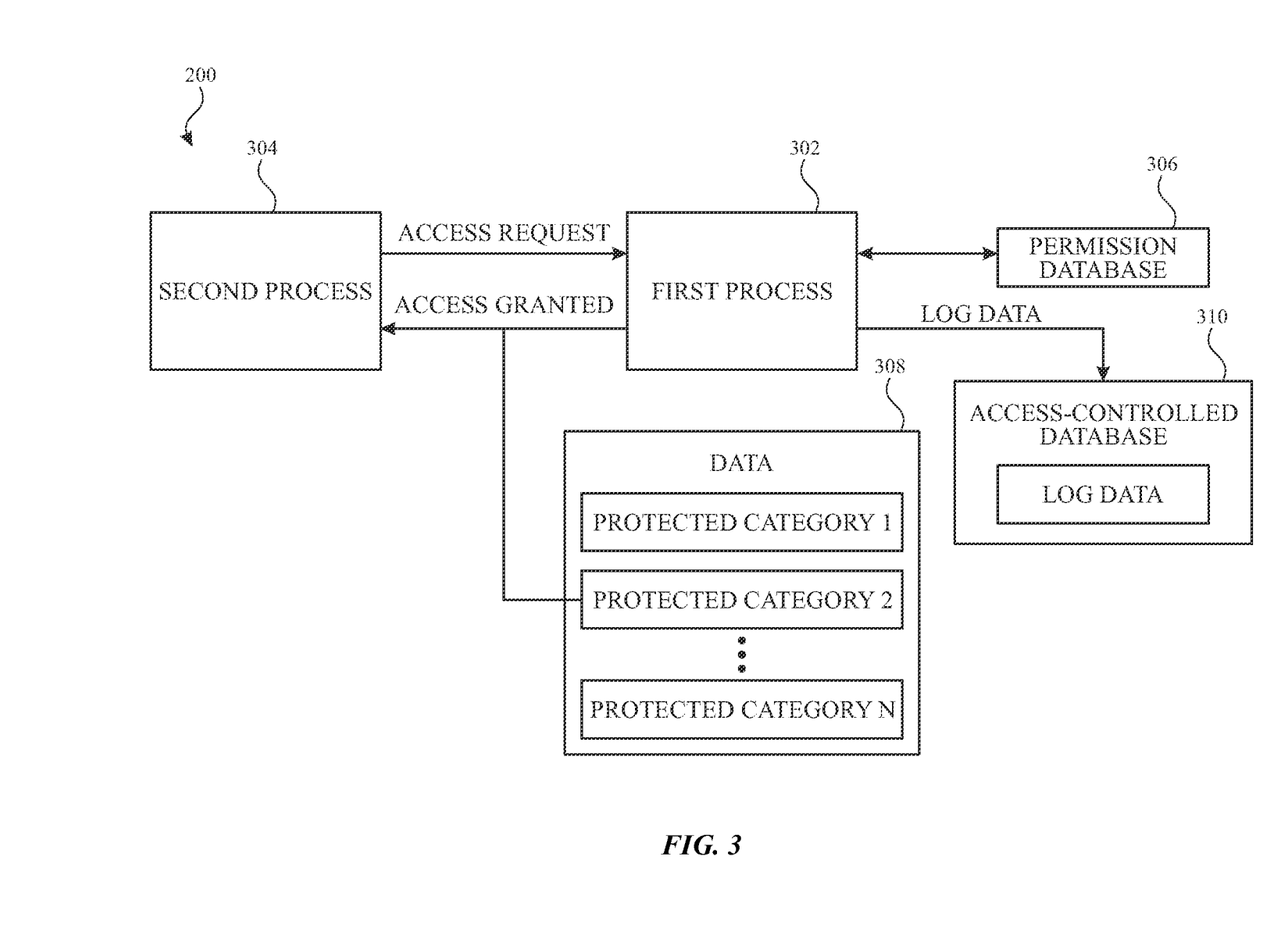
FIG. 3 illustrates a schematic diagram illustrating an access logging operation, in accordance with one or more implementations of the present disclosure.

FIG. 3 illustrates a schematic block diagram of one or more components of the system 200, according to one or more implementations of the present disclosure. As shown, a first process 302 (e.g., a system process) may receive an access request from a second process 304 (e.g., an application and/or a process associated with an application). In the example of FIG. 3, the access request may include a request to access data corresponding to protected data category 2 of the user data 308.

On receiving the access request, the first process 302 may determine whether the second process 304 is authorized to access the data corresponding to protected data category 2 (e.g., using the permission database 306 and/or by requesting user authorization for the access). In cases in which the first process 302 determines that the second process 304 is authorized to access the data, the first process 302 may grant the second process 304 access to the data corresponding to protected data category 2 in this example. FIG. 3 also illustrates how, the first process 302 may generate log data associated with the access of data and store the log data in the access-controlled database 310.

Figure 4:
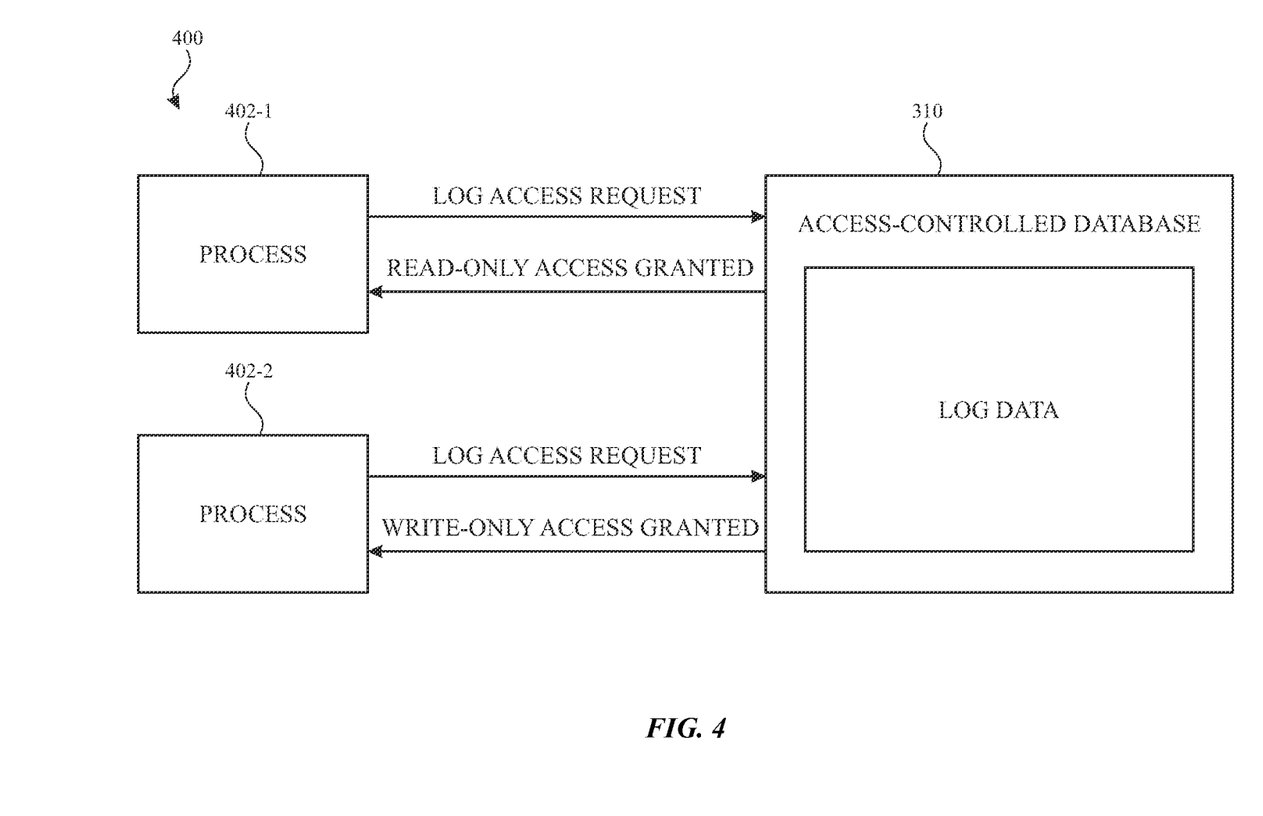
FIG. 4 illustrates an access request for log data, in accordance with one or more implementations of the present disclosure.

FIG. 4 illustrates a schematic block diagram 400 of one or more system process accessing the access-controlled database 310, according to one or more implementations of the present disclosure. As shown, a process 402-1 may transmit a log access request or query to an access-controlled database 404. In an example, the process 402-1 may be a system process having read-only access rights, and therefore, a read-only access to the log data may be granted to the process 402-1. As shown in the example of FIG. 4, another process 402-2 may transmit a log access request or query to an access-controlled database 404. In an example, the process 402-2 may be an application process having write-only access rights, and therefore, a write-only access to the log data may be granted to the process 402-2.

Figure 5:
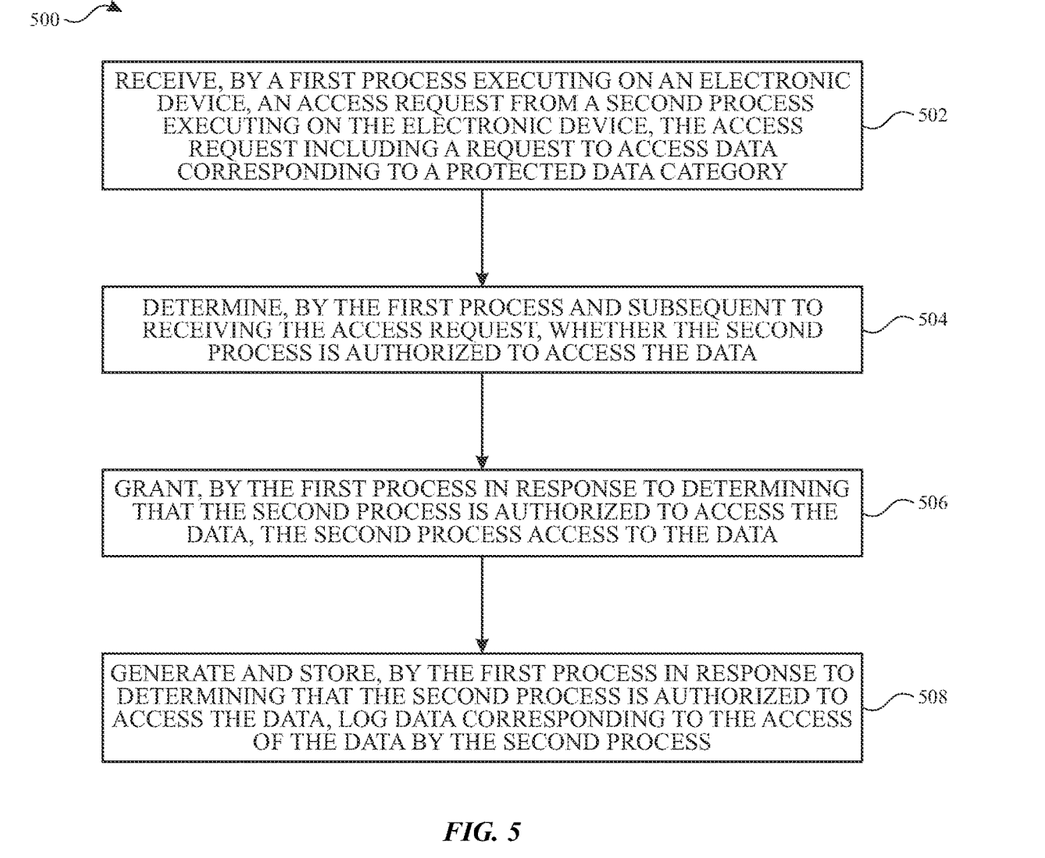
FIG. 5 illustrates a flowchart of a process of logging data access by an application, in accordance with one or more implementations of the present disclosure.

FIG. 5 illustrates a flowchart of a process 500 of logging data access by an application, in accordance with one or more implementations of the present disclosure. For explanatory purposes, the process 500 is primarily described herein with reference to the electronic device 110 and the system 200 of FIGS. 1 and 2. However, the process 500 is not limited to the electronic device 110 and the system 200 of FIGS. 1 and 2, and one or more blocks (or operations) of the process 500 may be performed by one or more other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, a first process (e.g., first process 302) executing on an electronic device (e.g., electronic device 110) receives an access request from a second process (e.g., second process 304) executing on the electronic device. The access request may include a request to access data corresponding to a protected data category. In an example, the first process may be a system process and the second process may be an application process. For example, the application process may correspond to a process of an application such as a social media application or another application running at the electronic device. In one illustrative example, the second process may be a third-party process. In other examples, the second process may be a system process, a first-party application process provided by a developer of an operating system of the electronic device, or another process The protected data category may include, but is not limited to, a photo category, a contact category, a location category, a microphone category, and a camera category.

At block 504, subsequent to receiving the access request, the first process determines whether the second process is authorized to access the data. In an example, the determination may be made on the basis of permissions associated with an application corresponding to the second process. The permissions may include permissions previously specified or acknowledged by a user of the electronic device 110, for example, during installation of the application and/or later, may be are stored in a permission database. In one or more implementations, the first process may check the permission database and/or prompt a user to determine whether the second process is authorized to access the data.

At block 506, the process 500 includes granting, by the first process in response to determining that the second process is authorized to access the data, the second process access to the data. In one or more implementations, the access may be granted only to the data corresponding to the protected data category for which the second process has the authorization and/or permission to access. In an example, granting access to data may include providing the requested data to the second process.

At block 508, the process 500 includes generating and storing, by the first process in response to determining that the second process is authorized to access the data, log data corresponding to the access of the data by the second process. In an example, the log data includes a structured log entry that includes an identifier of the second process, an identifier of the data accessed by the second process, and time information corresponding to the access of the data. The log data may further include a number of files and a name of the files accessed by the second process in the protected data category. For instance, in one illustrative example, a social media application may access one or more photos, and the log data may include a name of the photos, an identifier of the social media application, a number of photos accessed, and/or a time or duration of the access to the one or more photos. In another example, the log data may include an indicator of whether an application corresponding to the second process was in the foreground of the display of the electronic device at the time of the access of the data. In another example, the log data may include identifiers of both an accessor process and a broadcaster process of a screen recording event.

In an example, the storing includes storing the log data in an access-controlled database, such as the access-controlled database 208, which may be directly accessible to one or more system processes at the electronic device based on one or more access rights. The access rights may be read-only access rights and/or write-only access rights in some examples.

In an example, in the process 500, the accessing of the data may correspond to an instantaneous access event, and the time information may include a timestamp associated with the instantaneous access event. In another example, in the process 500, the accessing of the data may correspond to a durational access event, and the time information may include a start timestamp and an end timestamp associated with a respective beginning and end of the durational access event.

In an example, in the process 500, the log data may be displayed in a time series format on a display of the electronic device. In said example, a logging process at the electronic device may align the log data in time with at least one additional stored log data for time-aligned display. For example, the aligned log data may be viewable and/or searchable according to access time (e.g., so that all data access events in a given time period, such as between 10:00 AM and 10:35 AM on a particular day on one illustrative example can be easily viewed by the user).

In some examples, the process 500 may include deleting the log data automatically after a predefined retention period (e.g., every fortnight or every month). In an example, the retention period may be configurable. Accordingly, a user may set the retention period by providing corresponding user inputs.

In the process 500, the second process may be a first-party process, a system process, a third-party process or another process. In the process 500, the second process may make a call for the access request to an access control system corresponding to the first process. After providing the access to the data and separately from providing the access to the data, the access control system may trigger a logging process to generate the log data and store the log data in a repository, in one or more implementations.

In an example, the process 500 may further include receiving a query for stored log data for the second process. The process 500 may include generating and providing the query results for the query. In an example, the query results identify information for each protected data category accessed by the second process. For instance, in the example of the social media application, the query results may include details of the photos accessed by the social media application, separately from details of camera usage by the social media application, microphone usage by the social media application, or accesses of other categories of protected data by the social media application.

Figure 6:
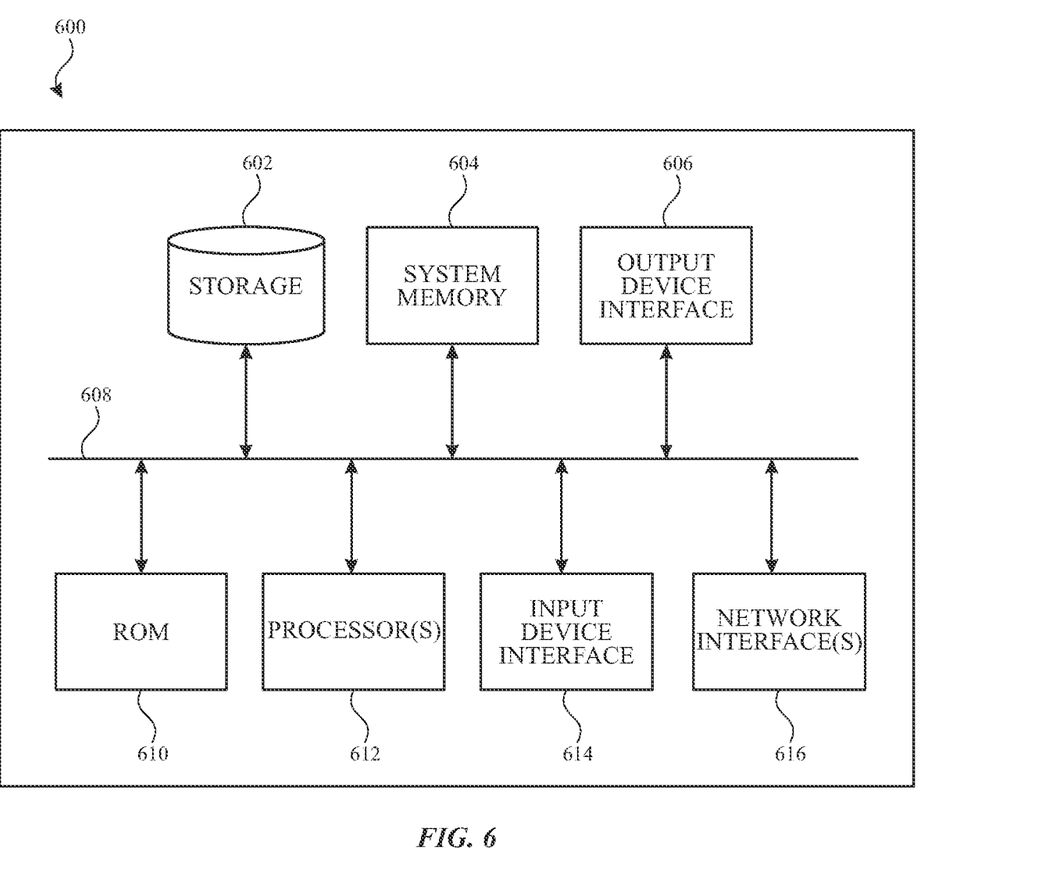
FIG. 6 illustrates an example electronic system with which aspects of the subject technology may be implemented in accordance with one or more implementations of the present disclosure.

FIG. 6 depicts a computing-device based implementation of the system of FIG. 2 in accordance with one or more implementations of the present disclosure. The system 600 can be, and/or can be a part of, the electronic device 110, and/or the server 120 shown in FIG. 1. The system 600 may include various types of computer readable media and interfaces for various other types of computer readable media. The system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the system 600. The permanent storage device 602, on the other hand, may be a read-and-write memory device. The permanent storage device 602 may be a non-volatile memory unit that stores instructions and data even when the system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the system 600. Input devices that may be used with the input device interface 614 may include, for example, alphanumeric keyboards and pointing devices (also called "cursor control devices"). The output device interface 606 may enable, for example, the display of images generated by the system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the system 600 to one or more networks and/or to one or more network nodes, such as the electronic device 110 shown in FIG. 1, through the one or more network interface(s) 616. In this manner, the system 600 can be a part of a network of computers (such as a LAN, a wide area network ("WAN"), or an Intranet, or a network of networks, such as the Internet. Any or all components of the system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

The present disclosure recognizes that the use of personal information data, in the present technology, can be used to the benefit of users. For example, the personal information can be used for logging access by applications. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of access logging operation, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementation or embodiments, the present disclosure also contemplates that the various embodiments can also be implemented without the need for accessing such personal information data. That is, the various embodiments of the present technology are not rendered inoperable due to the lack of all or a portion of such personal information data.

In accordance with aspects of the disclosure, a method is provided that includes receiving, by a first process executing on an electronic device, an access request from a second process executing on the electronic device, the access request comprising a request to access data corresponding to a protected data category. The method further includes determining, by the first process and subsequent to receiving the access request, whether the second process is authorized to access the data. Further, the method includes granting, by the first process in response to determining that the second process is authorized to access the data, the second process access to the data. Furthermore, the method includes generating and storing, by the first process in response to determining that the second process is authorized to access the data, log data corresponding to the access of the data by the second process.

In accordance with other aspects of the disclosure, a system is provided that includes a processor; and a memory device containing instructions, which when executed by the processor, cause the processor to: receive, using a first process executing on an electronic device, an access request from a second process executing on the electronic device, the access request comprising a request to access data corresponding to a protected data category; determine, using the first process and subsequent to receiving the access request, whether the second process is authorized to access the data; grant, using the first process in response to determining that the second process is authorized to access the data, the second process access to the data; and generate and store, using the first process in response to determining that the second process is authorized to access the data, log data corresponding to the access of the data by the second process.

In accordance with other aspects of the disclosure, a non-transitory machine-readable medium is provided that includes code that, when executed by a processor, causes the processor to perform a method, the method including receiving, by a first process executing on an electronic device, an access request from a second process executing on the electronic device, the access request including a request to access data corresponding to a protected data category;

determining, by the first process and subsequent to receiving the access request, whether the second process is authorized to access the data; granting, by the first process in response to determining that the second process is authorized to access the data, the second process access to the data; and generating and storing, by the first process in response to determining that the second process is authorized to access the data, log data corresponding to the access of the data by the second process.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving, by a first process executing on an electronic device, an access request from a second process executing on the electronic device, the access request comprising a request to access data corresponding to a protected data category, wherein the second process makes a call for the access request to an access control system corresponding to the first process;

determining, by the first process and subsequent to receiving the access request, whether the second process is authorized to access the data; and granting, by the first process in response to determining that the second process is authorized to access the data, the second process access to the data; and generating and storing, by the first process in response to determining that the second process is authorized to access the data, log data corresponding to the access of the data by the second process, wherein after providing the access to the data and separately from providing the access to the data, the access control system triggers a logging process to generate the log data and store the log data in a repository.

2. The method of claim 1, wherein the first process is a system process and the second process is an application process.

3. The method of claim 1, wherein the protected data category is one of: a photo category, a contact category, a location category, a microphone category, and a camera category.

4. The method of claim 1, wherein the log data includes a structured log entry.

5. The method of claim 1, wherein storing the log data comprises storing the log data in an access-controlled database directly accessible to one or more system processes at the electronic device based on one or more access rights.

6. The method of claim 5, wherein the access rights include a read-only access right and a write-only access right.

7. The method of claim 1, wherein the log data includes an identifier of the second process, an identifier of the data accessed by the second process, and time information corresponding to the access of the data.

8. The method of claim 7, wherein the access of the data corresponds to an instantaneous access event and the time information includes a timestamp associated with the instantaneous access event.

9. The method of claim 7, wherein the access of the data corresponds to a durational access event and the time information includes a start timestamp and an end timestamp associated with a respective beginning and end of the durational access event.

10. The method of claim 1, wherein the log data is displayed in a time series format on a display of the electronic device.

11. The method of claim 10, wherein a logging process at the electronic device aligns the log data in time with at least one additional stored log data for time-aligned display.

12. The method of claim 1, further comprising deleting the log data automatically after a predefined retention period.

13. The method of claim 1, wherein the second process is a third-party process.

14. The method of claim 1, wherein storing the log data comprises storing the log data in an access-controlled database, and the access-controlled database is configured to receive queries for log data and provide query results responsive thereto.

15. The method of claim 14, wherein the query results identify information for each protected data category accessed by the second process.

16. An electronic device, comprising:
a processor; and
a memory device containing instructions, which when executed by the processor, cause the processor to:
receive, using a first process executing on the electronic device, an access request from a second process executing on the electronic device, the access request comprising a request to access data corresponding to a protected data category, wherein the second process makes a call for the access request to an access control system corresponding to the first process;
determine, using the first process and subsequent to receiving the access request, whether the second process is authorized to access the data; and
grant, using the first process in response to determining that the second process is authorized to access the data, the second process access to the data; and
generate and store, using the first process in response to determining that the second process is authorized to access the data, log data corresponding to the access of the data by the second process, wherein after providing the access to the data and separately from providing the access to the data, the access control system triggers a logging process to generate the log data and store the log data in a repository.

17. The electronic device of claim 16, wherein the first process is a system process and the second process is an application process.

18. A non-transitory machine-readable medium comprising instructions that, when executed by a processor, cause the processor to perform operations comprising:
receiving, by a first process executing on an electronic device, an access request from a second process executing on the electronic device, the access request comprising a request to access data corresponding to a protected data category, wherein the second process makes a call for the access request to an access control system corresponding to the first process;
determining, by the first process and subsequent to receiving the access request, whether the second process is authorized to access the data; and
granting, by the first process in response to determining that the second process is authorized to access the data, the second process access to the data; and
generating and storing, by the first process in response to determining that the second process is authorized to access the data, log data corresponding to the access of the data by the second process, wherein after providing the access to the data and separately from providing the access to the data, the access control system triggers a logging process to generate the log data and store the log data in a repository.

19. The electronic device of claim 16, wherein storing the log data comprises storing the log data in an access-controlled database directly accessible to one or more system processes at the electronic device based on one or more access rights, wherein the log data includes a structured log entry.

20. The electronic device of claim 19, wherein the access rights include a read-only access right and a write-only access right.

* * * * *